United States Patent [19]

Piroozmandi et al.

[11] Patent Number: 5,313,022

[45] Date of Patent: May 17, 1994

[54] LOAD CELL FOR WEIGHING THE CONTENTS OF STORAGE VESSELS

[75] Inventors: Farid Piroozmandi, Bothell; Walter P. Kistler, Redmond, both of Wash.

[73] Assignee: Kistler-Morse Corporation, Redmond, Wash.

[21] Appl. No.: 975,464

[22] Filed: Nov. 12, 1992

[51] Int. Cl.$^5$ .......................... G01G 3/14; G01L 1/22
[52] U.S. Cl. ................................ 177/211; 73/862.045; 73/862.627
[58] Field of Search .............................. 177/211, 199; 73/862.045, 862.627; 338/2–6

[56] References Cited

U.S. PATENT DOCUMENTS

| | | | |
|---|---|---|---|
| 3,072,209 | 1/1963 | Perry, Jr. | 177/211 |
| 3,266,584 | 8/1966 | Lee | 177/211 |
| 3,678,495 | 10/1972 | Vogt | 177/211 |
| 3,706,349 | 12/1972 | Paelian et al. | 177/211 |
| 3,960,013 | 6/1976 | Ormund | 177/211 X |
| 4,044,920 | 8/1977 | Swartzendruber | 177/211 X |
| 4,600,912 | 7/1986 | Marks et al. | 338/4 X |
| 4,776,414 | 12/1988 | Badcock | 177/211 |
| 4,858,710 | 8/1989 | Krause | 177/211 |

*Primary Examiner*—George H. Miller, Jr.
*Attorney, Agent, or Firm*—Seed and Berry

[57] ABSTRACT

A load cell adapted to be positioned between a foundation and each of several support members for a storage vessel. The load cell includes a circular flex plate having a pair of concentric cylindrical members of different diameters secured to opposite surfaces. A mounting pad adapted to be fastened to the foundation is secured to one of the cylindrical members. A mounting plate is secured to the other cylindrical member. The mounting plate has either a single threaded bore or a threaded stud positioned at the common axis of the cylindrical members for securing the mounting plate to a vessel support member. A strain sensor mounted on the flex plate measures the load-induced deflection of the flex plate.

26 Claims, 6 Drawing Sheets

LOAD CELL FOR WEIGHING THE CONTENTS OF STORAGE VESSELS

TECHNICAL FIELD

This invention relates to load cells, and more specifically a load cell for accurately measuring the weight of the contents of a storage vessel.

BACKGROUND OF THE INVENTION

A manufacturer or a user of bulk materials generally wants to keep track of the amount of goods contained in a storage vessel, such as a large bin or silo. A number of conventional instruments mounted inside the storage container are available for this purpose. There are level measuring indicators, some of which are mechanical, such as so called "plumb bobs", and others of which are electric, such as capacity probes, ultrasound ranging systems, and microwave ranging systems.

However, none of these conventional instruments give very accurate information about the weight of the stored material, and, since they are located inside the storage container, they can easily corrode or gum up with sticky material and require servicing. As a result of these problems with internal instruments, the presently preferred approach is to weigh the contents of the silo. This approach gives much more precise and valuable information, and, since the weighing devices are located outside the tank, the instruments are not subject to the effect of corrosive or abrasive materials, and thus normally do not require servicing.

One conventional device using load cells to weigh the contents of a storage container is described in U.S. Pat. No. 4,596,155 to Kistler. The Kistler patent describes a load cell which basically consists of an inverted cup inside of which a two axis strain sensor is mounted. When a load is applied to the center of the top surface of this load cell, this top surface is spherically deformed. The magnitude of this deformation is measured using the two-axis strain sensor to provide an accurate measure of the applied load. The basic simplicity, relatively low cost and good accuracy of this type of load cell has made it very successful. However, like most other load cells, it cannot be bolted to either the foundation or a floor or other support structure. As a result, the vessel simply rests on the load cells without being solidly tied down. Consequently, a tall outdoor silo could easily topple in strong winds or during a minor earthquake. To prevent this, horizontal flexible tie rods are used to laterally restrain the silo or tank. Vertical tie rods, which cannot contact the tank or its support structure, are installed to prevent it from toppling over. This makes installation rather complex and expensive and large measuring errors may result if, for example, the tank is vertically restrained as a result of improper installation of the vertical tie bolts.

Several efforts have been made to modify the device shown in the Kistler patent to provide attachment to a floor or support structure through bolting or welding. However, all of these approaches either degrade the accuracy of the load cell or make the load cell incapable of withstanding certain types of loads without being damaged. For example, U.S. Pat. No. 4,166,997 to Kistler describes a cylindrical load cell having a lower mounting plate that is secured by multiple bolts to a floor, and an upper mounting plate that is secured by multiple bolts to a storage container support member. The load cell has a circular flex plate that is coupled to the upper and lower mounting plate at different radial positions so that the plate deforms in proportion to the weight of the storage container and its contents. The magnitude of the flex plate strain is measured by conventional strain sensing means to provide an indication of the weight of the contents of the storage container.

Although the device disclosed in the Kistler '997 patent may perform well in some applications, it is easily damaged by bending moments applied to the load cell. These bending moments can be caused by angular misalignments of the storage vessel support structures that are secured to the load cell. More particularly, since the load cell disclosed in the Kistler '997 patent is bolted to a vessel support member at multiple points, the angle between the support member and the upper surface of the load cell is fixed. Similarly, since the load cell disclosed in the Kistler '997 patent is bolted to a floor surface at multiple points, the angle between the floor surface and the lower surface of the load cell is fixed. As a result, any change in the angle between the support member and the floor surface must be accommodated by a lateral bending of the load cell.

Bending moments can also be applied to the load cell described in the '997 Kistler patent by lateral forces that the support structure applies to the load cell. A lateral force applied to the load cell by the support member will impart a bending moment to the load cell having a magnitude that is equal to the product of the force and the vertical thickness of the load cell (ie., the product of the force and the moment arm).

The design of the load cell described in the Kistler '997 patent is inherently incapable of accommodating substantial bending moments caused by either angular misalignments or lateral forces as described above. As a result, the load cells described in the Kistler '997 patent have been subject to frequent damage.

SUMMARY OF THE INVENTION

It is an object of the invention to provide a load cell specially designed for weighing a storage vessel that can be bolted to both a support surface and to the storage vessel.

It is another object of the invention to provide a load cell that not only accurately measures compressive as well as tensile forces, but is also able to withstand considerable side loads without damage while maintaining its weighing accuracy.

It is another object of the invention to provide a load cell that not only accurately measures compressive as well as tensile forces, but is also able to withstand considerable bending moments without damage while maintaining its weighing accuracy.

It is still another object of the invention to provide a load cell specially designed for accurately weighing a storage vessel that can be bolted to both a support surface and to the storage vessel, and yet is able to accommodate transverse movement.

These and other objects of the invention are provided by a load cell for weighing the contents of a storage vessel supported on a foundation by a plurality of storage vessel support members. The load cell includes first and second, concentrically positioned cylindrical members secured to opposite sides of a resilient, generally planar, circular flex plate. A mounting pad secured to the first cylindrical member is fastened either to the foundation or to one of the storage vessel support members. A mounting plate fastened to the second cylindrical member has a single attachment structure positioned at the axis of the first and second cylindrical members. The single attachment structure secures the mounting plate either to the foundation or to one of the storage vessel support members. A strain sensor mounted on the flex plate generates an electrical indication of the load-induced strain of the flex plate so that the weight of the contents of the storage vessel can be determined from the electrical indications generated by the load cells supporting each of the vessel support members.

The single attachment structure is preferably either a threaded bore formed in the mounting plate or a threaded stud projecting from the mounting plate. The second cylindrical member preferably has a relatively thick mid section thereby strengthening the second cylindrical member. Although the first and second cylindrical members and the flex plate may be separate pieces that are fastened to each other such as by welding, they preferably are machined from a unitary piece of a resilient material. The strain sensor may be mounted on the flex plate on either its upper surface or its lower surface, or two strain sensors may be used, one of which is mounted on its upper surface and the other of which is mounted on its lower surface.

The load cell may also include an adapter plate secured to the upper surface of the mounting plate through the single attachment structure. The single attachment structure is preferably a threaded bore formed in the mounting plate so that the adapter plate may be secured to the upper surface of the mounting plate by a bolt extending through an aperture formed in the adapter plate.

The load cell may also be secured to the foundation in a manner that readily permits limited transverse movement of the load cell. According to this aspect of the invention, a slide plate having a smooth, planar upper surface is mounted on the foundation beneath either the mounting pad or the adapter plate. A layer of low friction material is preferably positioned between the upper surface of the slide plate and the mounting pad or adapter plate. A pair of retainer bars are secured at opposite ends to the foundation. The retainer bars extend over and capture the slide member while allowing the load cell to slide on the slide plate for a limited distance.

DETAILED DESCRIPTION OF THE PREFERRED EMBODIMENT

Figure 1:
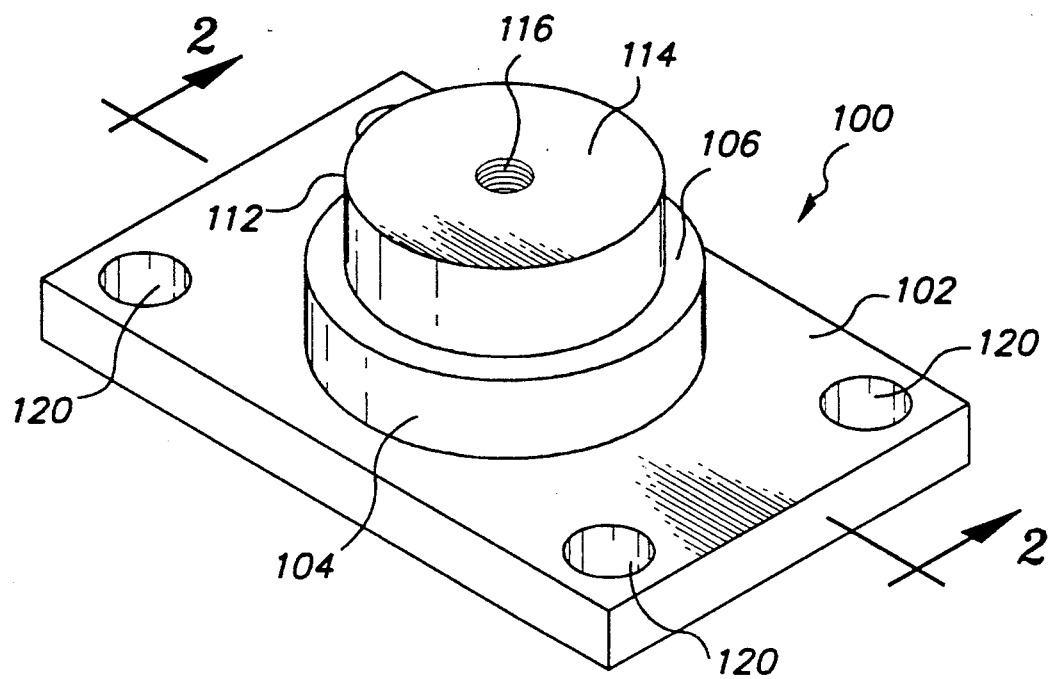
FIG. 1 is an isometric view of one embodiment of the inventive load cell.
Figure 2:
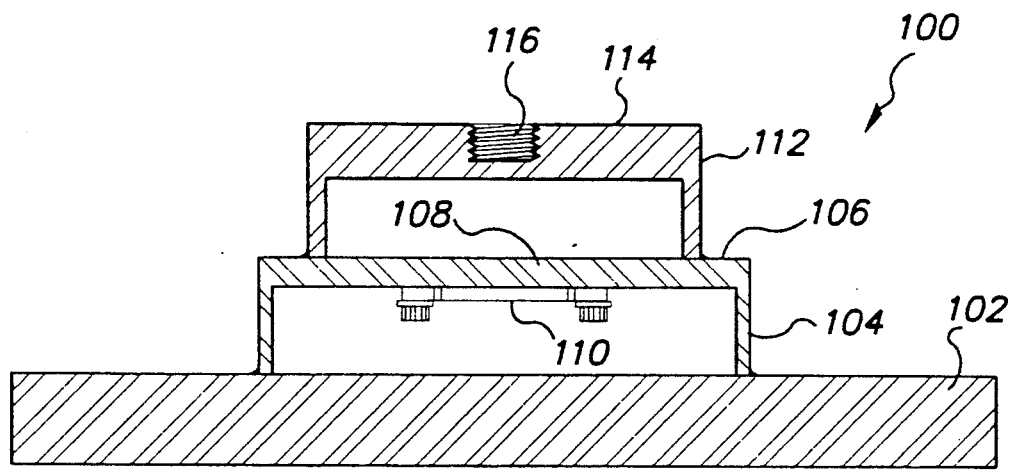
FIG. 2 is a cross-sectional view of the load cell of FIG. 1 taken along the line 2—2 of FIG. 1.

One embodiment of the inventive load cell is illustrated in FIGS. 1 and 2. The load cell 100 includes a solid, rigid base 102 onto which a first inverted cup 104 is welded. The bottom 106 of the cup 104 includes a central flex-plate portion 108 which, as explained below, is strained as a function of the magnitude of an applied load. A two-axis strain sensor 110 of conventional design is bolted to the flex-plate portion 108 in order to measure the magnitude of its strain or deflection. A suitable two-axis strain sensor 110 is disclosed in U.S. Pat. No. 4,596,155 which is incorporated herein by reference.

A second, smaller diameter inverted cup 112 is welded to the bottom 106 of the first cup 104 so that the bottom of the cup 112 forms an upper mounting plate 114. A single threaded bore 116 is machined in the center of the mounting plate 114 for attachment to a storage vessel support member (not shown). The entire load cell 100 is mounted to a floor or support surface (not shown) through a plurality of bolt holes 120 formed in the base 102.

When the base 102 is bolted to a floor or support surface, it will be apparent that the base 102 cannot easily pivot about a horizontal axis. As a result, any angular movement of a storage vessel support member must be accommodated by either the load cell 100 itself or by the interface between the load cell 100 and the support member. Significantly, the inventive load cell 100 uses a single point of attachment between a structural member and the load cell 100. In the embodiment of FIGS. 1 and 2, this single point of attachment is through the single threaded bore 116 machined in the center of the mounting plate 114. This single point of attachment has the advantageous property of allowing the interface between the structural member and the mounting plate 114 to pivot at the single point. This pivotal movement is possible either because a bolt (not shown) threaded into the bore 116 flexes with relatively ease or because the bolt is sufficiently loose to allow some free play between the structural member and the mounting plate 114.

Figure 3:
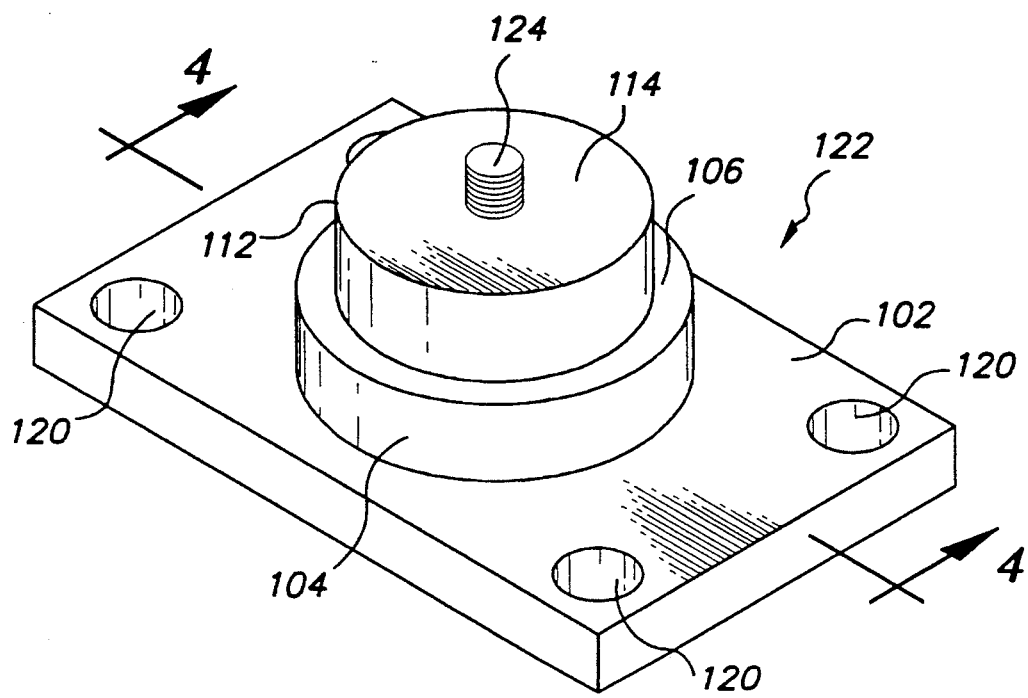
FIG. 3 is an isometric view of an alternative embodiment of the inventive load cell.
Figure 4:
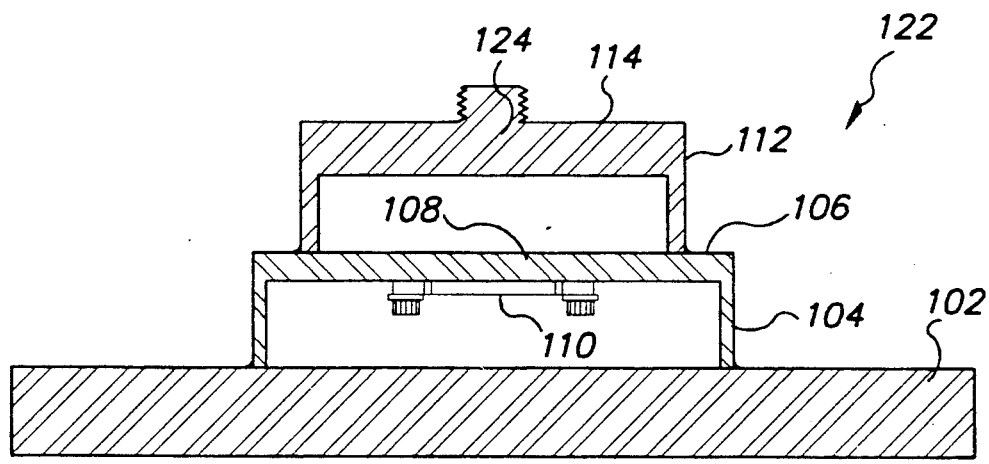
FIG. 4 is a cross-sectional view of the load cell of FIG. 3 taken along the line 4—4 of FIG. 3.

FIGS. 3 and 4 show an alternative embodiment 122 of the inventive load cell. This load cell embodiment 122 uses most of the same components of the load cell 100 of FIGS. 1 and 2 which, for purposes of consistency, have been designated with the same reference numerals. The load cell 122 of FIG. 3 differs from the load cell 100 of FIGS. 1 and 2 by using a threaded stud 124 on the upper surface of the upper mounting plate 114 in place of the threaded bore 116 that is used in the load cell 100 of FIGS. 1 and 2.

The load cell 122 of FIGS. 3 and 4 is used in the same manner as the load cell 100 of FIGS. 1 and 2 except that, instead of passing a bolt through a support member (not shown) and into the bore 116, the threaded stud 124 is place through a structural member, and a nut (not shown) is threaded on the stud 124 to secure the support member to the upper mounting plate 114.

Figure 5:
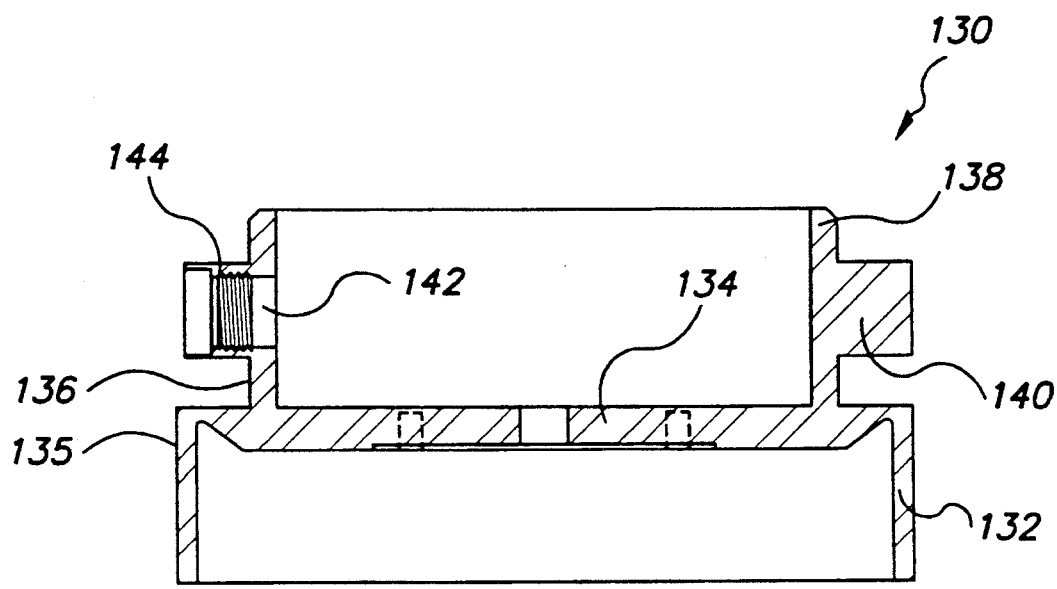
FIG. 5 is a cross-sectional view of a portion of an embodiment of the inventive load cell machined from a unitary piece of material.

In order to achieve optimum performance, the two inverted cups 104, 112 are preferably machined from a unitary piece of material to form a load cell component 130 illustrated in FIG. 5. The load cell component 130 includes a bottom inverted cup 132 having a flex plate 134 extending between the upper edges of a cylindrical wall 135. The flex plate 134 is also connected to a cylindrical wall 136 of a top cup 138. The wall 136 of the top cup 138 has a thicker mid section 140 to strengthen the wall 136 to allow it to bear greater loads. The thicker mid section 140 prevents deformation of the wall under load while assuring even transferring of a load to the flex plate 134. The thicker mid section 140 also helps to isolate the flex plate 134 from mechanical disturbances from the attachment of a storage vessel support structure. By transferring the load through the cylindrical wall 136, the flex plate 134 will always deflect in the same spherical shape independently of variations in the applied load pattern, thus making load cell component 130 insensitive to off-center loading. A cylindrical bore 142 is formed in the mid section 140 at one location, and an electrical connector 144 of conventional design is mounted on the mid section 140 over the bore 142 for attaching the load cell component 130 to an electronic readout device (not shown) of conventional design.

Figure 6:
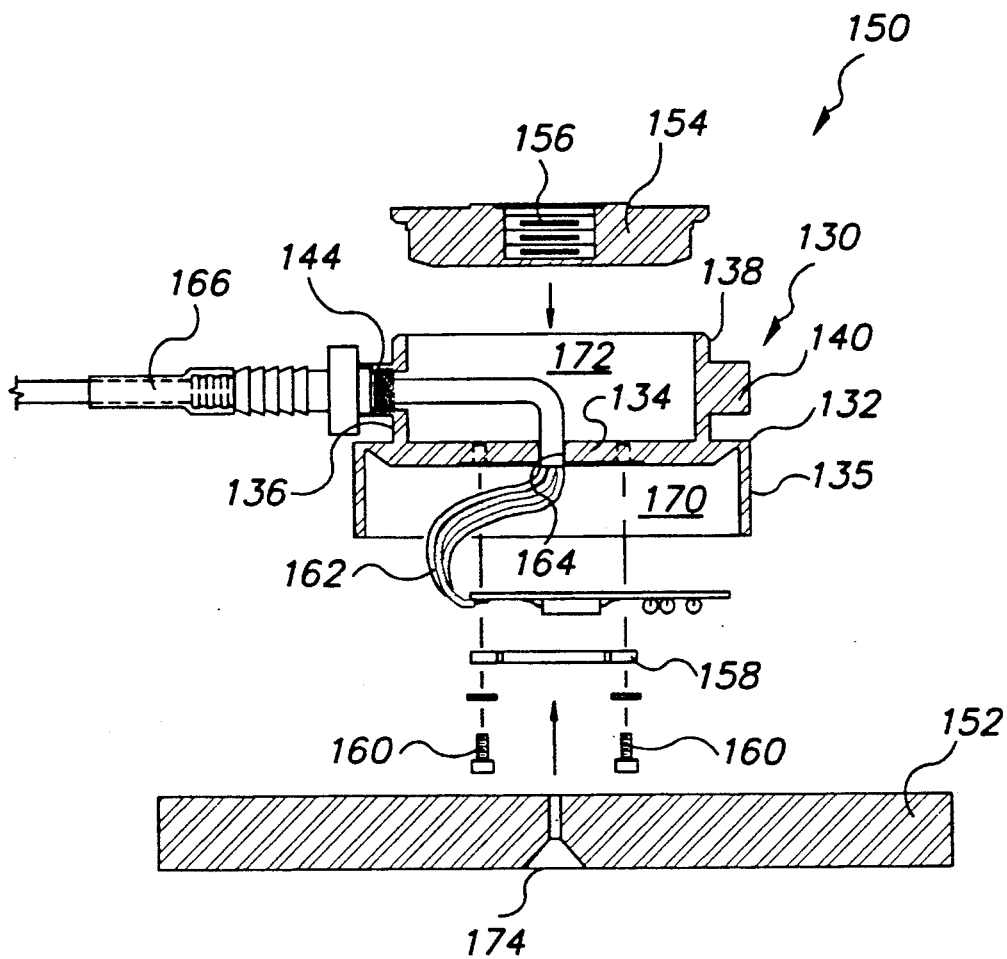
FIG. 6 is an exploded cross-sectional view of a complete load cell using the load cell portion shown in FIG. 5.

The load cell component 130 of FIG. 5 is shown in FIG. 6 along with additional components to form a complete load cell 150. The load cell 150 includes a base plate 152 that is welded to the cylindrical wall 135 of the cup 132. A circular top mounting plate 154 having a threaded center bore 156 is welded to the upper edge of the top cup 138. A two axis strain sensor 158 of conventional design is attached to the flex plate 134 by screws 160 threaded into the flex plate 134. The strain sensor 158 is connected to the electrical connector 144 through a printed circuit board and conductors 162 which extend through a hole 164 formed in the center of the flex plate 134. A cable 166 connects the strain sensor 158 to a conventional readout device (not shown) to provide an indication of the magnitude of the load applied to the load cell 150.

It will be apparent from FIG. 6 that the space surrounded by the cylindrical wall 135 of the bottom cup 132 forms a bottom cavity 170, while the space surrounded by the cylindrical wall 136 of the top cup 138 forms a top cavity 172. The bottom cavity 170 is filled with a conventional potting material through a fill hole 174 formed on the base plate 152. The fill hole 174 is welded shut after potting has been completed. Similarly, the top cavity 172 is filled with potting material running through the hole 164 on flex plate 134 from lower cavity 170. The potting material is of the nature that after curing, it remains flexible so it does not restrain deflection of flex plate, it adheres to all surfaces it comes in contact with, and it does not shrink in volume. The potting material, due to its flex and adhesive characteristics, provides a sealed, fluid impenetrable environment for the strain sensor 158 and any related electronics inside the load cell 150. The conductors 162 extending from the connector 144 to the strain sensor 158 are also sealed by the same flexible potting material, and also preferably by either using solid wire conductors 162, or soldering a small section of stranded wires used in the conductors 162 to prevent fluid penetration into the load cell 150.

As mentioned above, the strain sensor 158 provides an electrical indication of the deflection of the flex plate 134 under load. Since the electrical output of load cells are standardized with respect to their rated load, when several load cells 150 are used to support the same vessel on respective vessel support structures, if the loading pattern (compression and/or tension) on the support structures change due to external factors (e.g., wind forces on the storage vessel or uneven distribution of material inside the vessel), the overall system load indication on the vessel is not affected.

Although the strain sensor 158 can be of any conventional design, semiconductor crystal strain gages, such as described in U.S. Pat. No. 4,596,155, are preferably used. Semiconductor crystal strain gages provide a high signal output. However, due to their nature, their resistance is not a linear function of applied strain. When two crystal strain gages are attached to opposite sides of the flex plate 134, a deflection of the flex plate 134 causes one strain gages to be compressed and another strain gage to be tensioned. Also when the two strain gages are attached on a strain sensor as described in U.S. Pat. No. 4,596,155 in a configuration that under strain one gage will be compressed and the other strain gage will be tensioned through electronically reverse exciting the two gages, their non-lenearity of the semiconductor strain gages tend to cancel because the non-linearity of a semiconductor strain gage is negative under tension and positive under compression. Through an effort to match the physical (mechanical and electrical) characteristics of each pair of gages that are attached to the same two axis strain sensor 158, an overall linearity of about +/−1.0% to +/−0.2% of full scale output can be attained. In precision weighing applications this level of accuracy is not acceptable.

In order to improve the linearity of the strain sensor 158, the strain sensor 158 is preferably prestrained so that the combined output of the two semiconductor crystal strain gages can be shifted to a specific range in their functional range where the resultant combined non-linearity of two gages is at its lowest possible state. A strain sensor 158 that deviates from linear output in the positive direction needs to be prestrained in the manner as if load cell is under tension to reduce strain sensor non-linearity. A strain sensor 158 that deviates from linear output in the negative direction needs to be prestrained in the manner as if load cell is under compression. Utilizing this procedure will result in load cells with nonlinearities ranging from +/−0.1% to +/−0.05% of full scale output or better.

The simplest method of installing the inventive load cell 100, 122 (FIGS. 1-4) is to bolt it to a foundation (not shown) through the bolt holes 120 formed in the base plate 102. A storage vessel support structure can then be fastened to the load cell 100, 120 with either a bolt (not shown) threaded into the bore 116 or a nut (not shown) threaded onto the stud 124.

Figure 7:
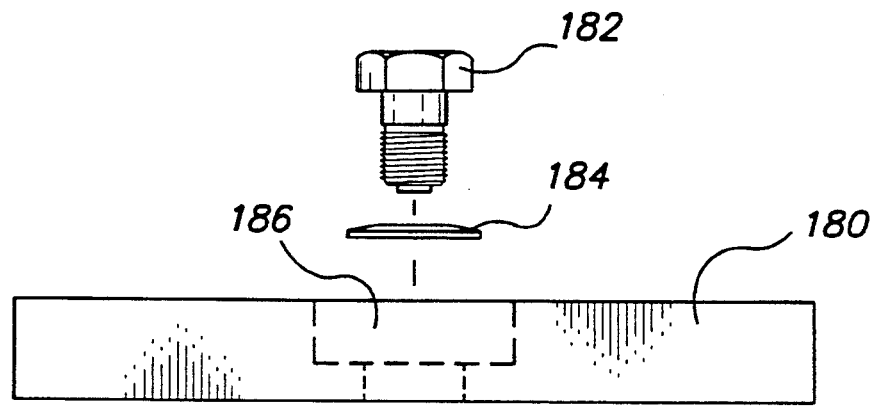
FIG. 7 is a side elevational view showing an adapter plate that can be used with the embodiment of the inventive load cell shown in FIG. 1.

Another method of using the load cell 100, 120 shown in FIGS. 1-4 is by using a top adapter plate 180 that is attached to the upper mounting plate 114 using a bolt 182 extending through a dome spring washer 184 and a bore 186 formed in the adapter plate 180. The adapter plate 180 is similar to the base 102 in that several bolt holes (not shown) are formed in the plate 180 (FIG. 7) for attaching the plate 180 to a storage vessel support structure (not shown).

Figure 8:
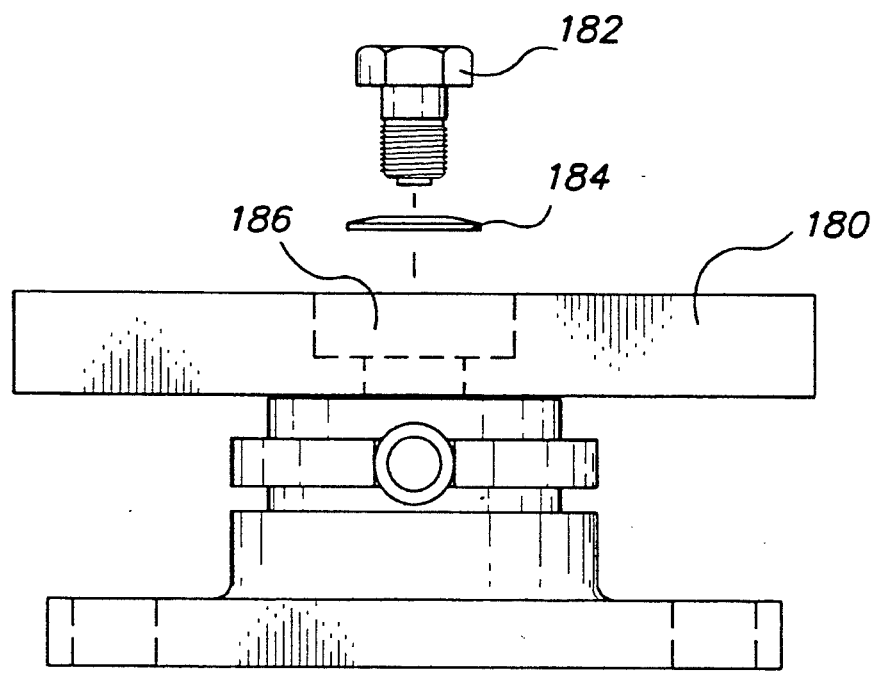
FIG. 8 is a side elevational view showing the adapter plate of FIG. 7 installed on the embodiment of the inventive load cell shown in FIG. 1.

The adapter plate 180 is shown being fastened to a load cell 100 in FIG. 8. The bolt 182 is first inserted through the washer 184 and bore 186, and is threaded into bore 116 formed in the upper mounting plate 114. A storage vessel support member is then secured to the top adapter plate 180, preferably by bolts (not shown).

The center bore 186 formed in the adapter plate 180 preferably has a slightly larger diameter than the bolt 182 thus allowing limited lateral and pivotal movement of the adapter plate 180. Also the length of the bolt 182 that is selected so that it bottoms down inside the upper mounting plate 114 before the dome spring washer 184 is totally compressed flat. As a result, the top adapter plate 180 can tilt by several degrees in all directions, and it is also free to move slightly in the vertical direction. The freedom of movement allows the load cell 100 to accommodate situations where the storage vessel support member is not even or the foundation on which the load cell 100 is mounted is sloped.

Figure 9:
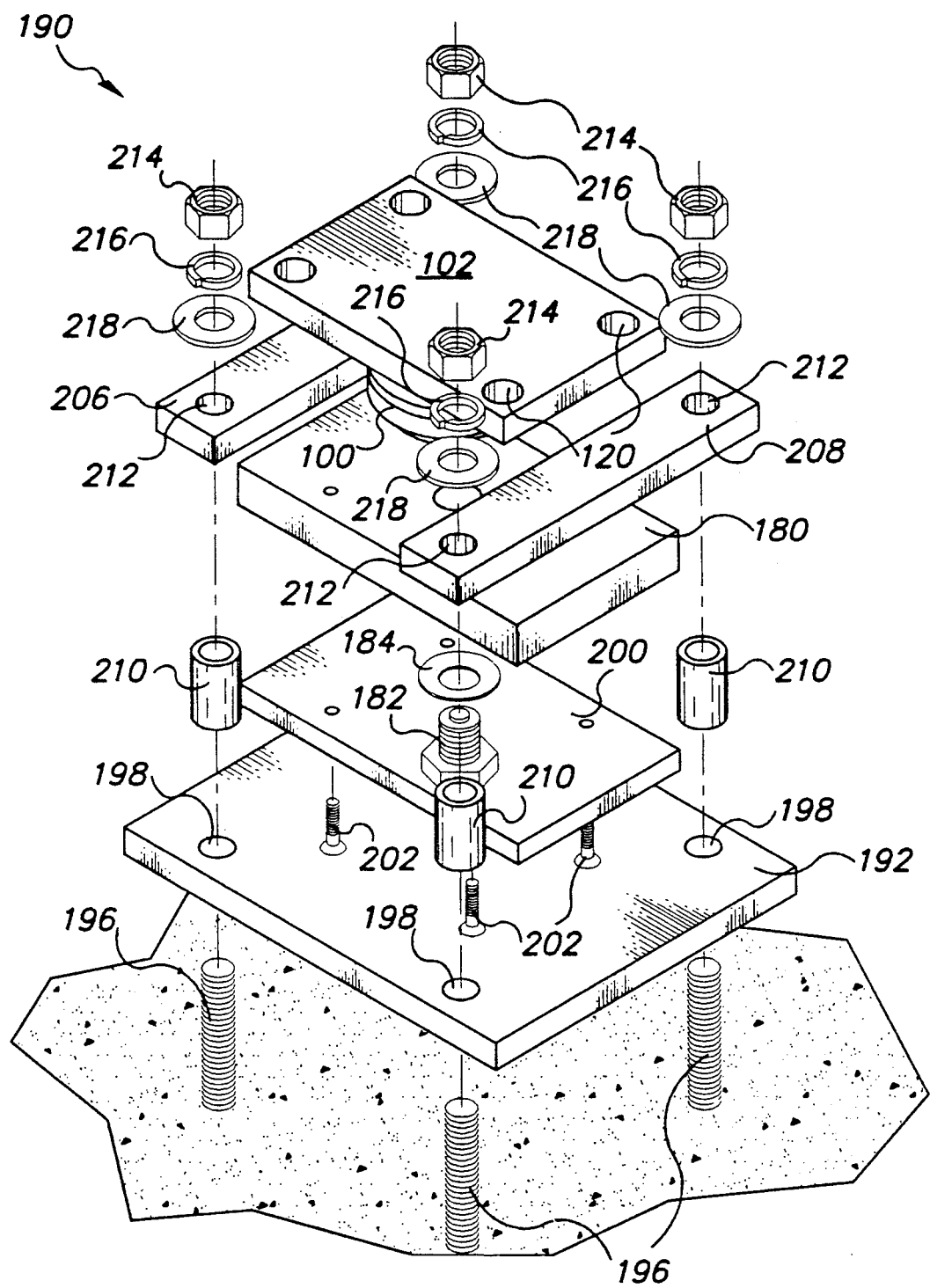
FIG. 9 is an exploded isometric view of an adapter mechanism that can be used with the inventive load cell to allow the load cell to accommodate lateral movement on a mounting surface.
Figure 10:
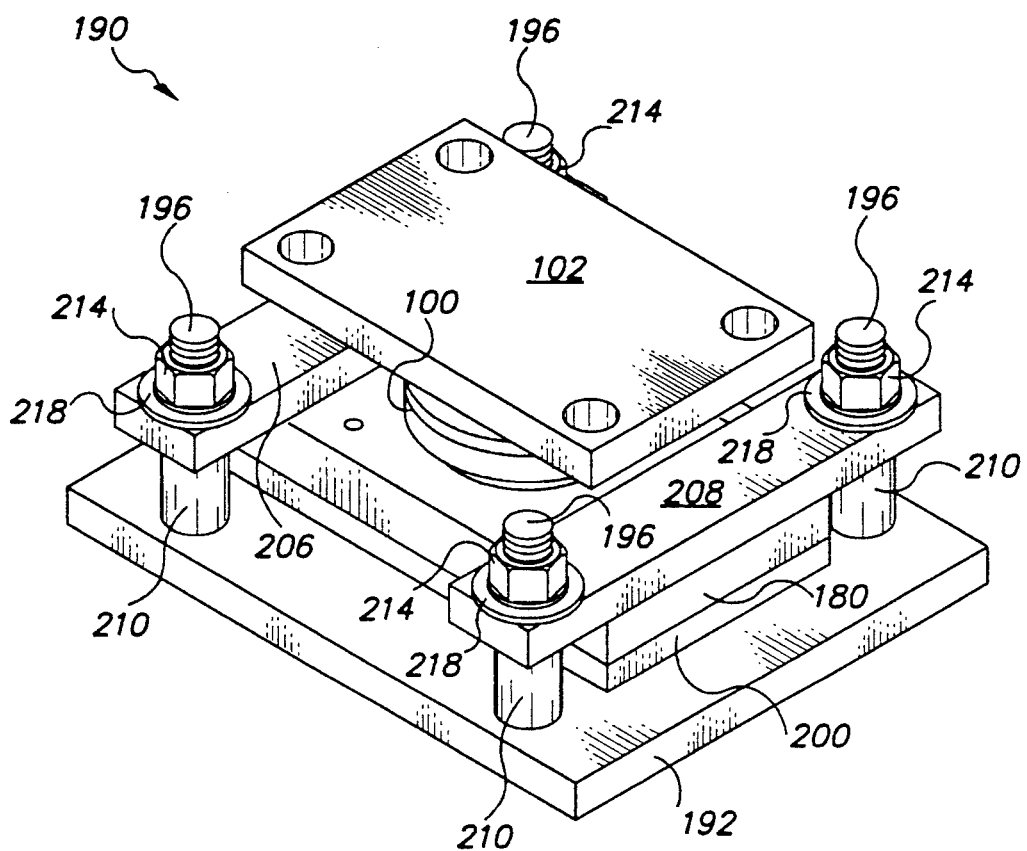
FIG. 10 is an isometric view of the adapter mechanism of FIG. 9 in its assembled condition shown installed with an inventive load cell.

In applications where the storage vessel supported by the load cells 100 undergoes thermal expansion and contraction, the support members for the vessel can apply large side loads to the load cell 100. Under these circumstances, the sliding installation hardware shown in FIGS. 9 and 10 can be advantageously utilized. The sliding installation hardware 190 uses the load cell 100 with the attached top adapter plate 180. The Load cell 100 is turned upside down, and a vessel support member is attached to the load cell base plate 102 preferable by using bolts extending through the bolt holes 120.

A sliding plate 192 is first placed on a foundation with embedded studs 196 extending upwardly through holes 198 in the sliding plate 192. A sliding pad 200 made of TEFLON ® or similar material with low coefficient of friction is then fastened to the top adapter plate 180 with screws 202. The sliding pad 200 and the top adapter plate 180 secured to the load cell 100 is then placed on the sliding plate 192. The load cell 100 is restrained from sliding off the sliding plate 192 by retainer bars 206, 208 that are attached to the sliding plate threaded studs 196. After passing through the sliding plate 192, the threaded studs 196 extend through respective spacers 210 and holes 212 formed in the retainer bars 206, 208. Finally, the retainer bars 206, 208 are secured in place by nuts 214 which are torqued against lockwashers 216 that bears against washers 218.

The sliding installation hardware 190 allows the load cell 100 attached to a storage vessel support member to have some limited freedom of movement in all directions thus accommodating vessel expansion and eliminating side loading on the load cell 100. As a result, the accuracy and sensitivity of the load cell 100 is relatively constant.

We claim:

1. A load cell for weighing the contents of a storage vessel supported on a foundation by a plurality of storage vessel support members, said load cell comprising:
   a mounting pad having a planar lower surface, said mounting pad further including fastening means for securing said mounting pad either to said foundation or to one of said storage vessel support members;
   a first cylindrical member having its lower edge secured to an upper surface of said mounting pad;
   a resilient, generally planar, circular flex plate having its lower surface secured to the upper edge of said first cylindrical member;
   a second cylindrical member having its lower edge secured to the upper surface of said flex plate so that said first and second cylindrical members are concentric with each other, the diameters of said first and second cylindrical members differing from each other so that a force exerted between the lower edge of said first cylindrical member and the upper edge of said second cylindrical member in a direction extending along the axis of said first and second cylindrical members causes said flex plate to deflect with a magnitude that is a function of the magnitude of said force;
   a mounting plate secured to the upper edge of said second cylindrical member, said mounting plate having a single attachment structure positioned at the axis of said first and second cylindrical members for securing said mounting plate either to said foundation or to one of said storage vessel support members; and
   a strain sensor mounted on said flex plate, said strain sensor generating an electrical indication of the strain of said flex plate thereby providing an indication of the magnitude of said force whereby the weight of the contents of said storage vessel can be determined from the electrical indications generated by the load cells supporting each of said vessel support members.

2. The load cell of claim 1 wherein said single attachment structure comprises a threaded bore formed in said mounting plate.

3. The load cell of claim 1 wherein said single attachment structure comprises a threaded stud projecting from said mounting plate.

4. The load cell of claim 1 wherein said second cylindrical member has a relatively thick mid section thereby strengthening said second cylindrical member.

5. The load cell of claim 1 wherein said first and second cylindrical members and said flex plate are machined from a unitary piece of a resilient material.

6. The load cell of claim 1 wherein said strain sensor is mounted on the upper surface of said flex plate.

7. The load cell of claim 1 wherein said strain sensor includes a dual-axis, metal foil strain gauge.

8. The load cell of claim 1 wherein said fastening means secures said mounting pad to said foundation.

9. The load cell of claim 8 wherein said fastening means secures said mounting pad to said foundation at a plurality of locations.

10. The load cell of claim 9 wherein said fastening means comprises a plurality of spaced apart bolt holes formed in said mounting pad.

11. The load cell of claim 1 further including a potting material filling the internal spaces of said load cell surrounded by said first and second cylindrical members.

12. The load cell of claim 11 further including a fill hole formed in a portion of said mounting pad underlying said first cylindrical member, said filling hole allowing said potting material to be injected into said internal spaces.

13. The load cell of claim 1 wherein said strain sensor is mounted on the lower surface of said flex plate.

14. The load cell of claim 13, further including a second strain sensor mounted on the upper surface of said flex plate.

15. The load cell of claim 14 wherein said first and second strain sensors are semiconductor crystal strain gages.

16. The load cell of claim 1 wherein said strain sensor includes a substantially square resilient frame secured to said flex plate, said frame having four legs one of which deflects responsive to deflection of said flex plate and has mounted thereon a pair of strain sensing semiconductor crystals.

17. The load cell of claim 16 wherein said strain sensor is prestrained so that said electrical indications from said semiconductor crystal strain gages can be combined and shifted to a specific range to minimize the combined non-linearity of said strain gages.

18. The load cell of claim 1, further including an adapter plate secured to the upper surface of said mounting plate through said single attachment structure, said adapter plate including attaching means for allowing said adapter plate to be secured either to said storage vessel support members or to said foundation.

19. The load cell of claim 18 wherein said attaching means comprise a plurality of spaced apart bolt holes formed in said adapter plate.

20. The load cell of claim 19, further including a dome spring washer through which said bolt extends prior to extending through said aperture, and wherein the length of said bolt is greater than the depth of said threaded bore thereby preventing said bolt from significantly compressing said spring washer.

21. The load cell of claim 18 wherein said single attachment structure comprises a threaded bore formed in said mounting plate, and wherein said adapter plate is secured to the upper surface of said mounting plate by a bolt extending through an aperture formed in said adapter plate.

22. The load cell of claim 21 wherein the diameter of said aperture is slightly larger than the diameter of said bolt thereby allowing limited lateral and pivotal movement of said adapter plate.

23. The load cell of claim 18 wherein said fastening means for securing said mounting pad to said foundation comprises:
 a slide plate mounted on said foundation, said slide plate having a smooth, planar upper surface, said slide plate being positioned beneath a slide member formed by either said mounting pad or said adapter plate;
 a layer of low friction material positioned between the upper surface of said slide plate and said slide member thereby allowing said slide member to slide easily on said slide plate; and
 a pair of retainer bars secured at opposite ends to said foundation, said retainer bars extending over and capturing said slide member while allowing said slide member to slide on said slide plate for a limited distance.

24. The load cell of claim 23 wherein said retainer bars are secured to said foundation by a plurality of threaded studs extending from said foundation through respective holes in said slide plate and respective spacers positioned between the upper surface of said slide plate and the lower surfaces of said retainer bars, the lengths of said spacers being slightly longer than the thickness of said slide member.

25. The load cell of claim 23 wherein said low friction material is secured to the lower surface of said slide member so that said slide member and said low friction material slide together on said slide plate.

26. The load cell of claim 23 wherein said slide member is formed by said adapter plate.

* * * * *